UNITED STATES PATENT OFFICE.

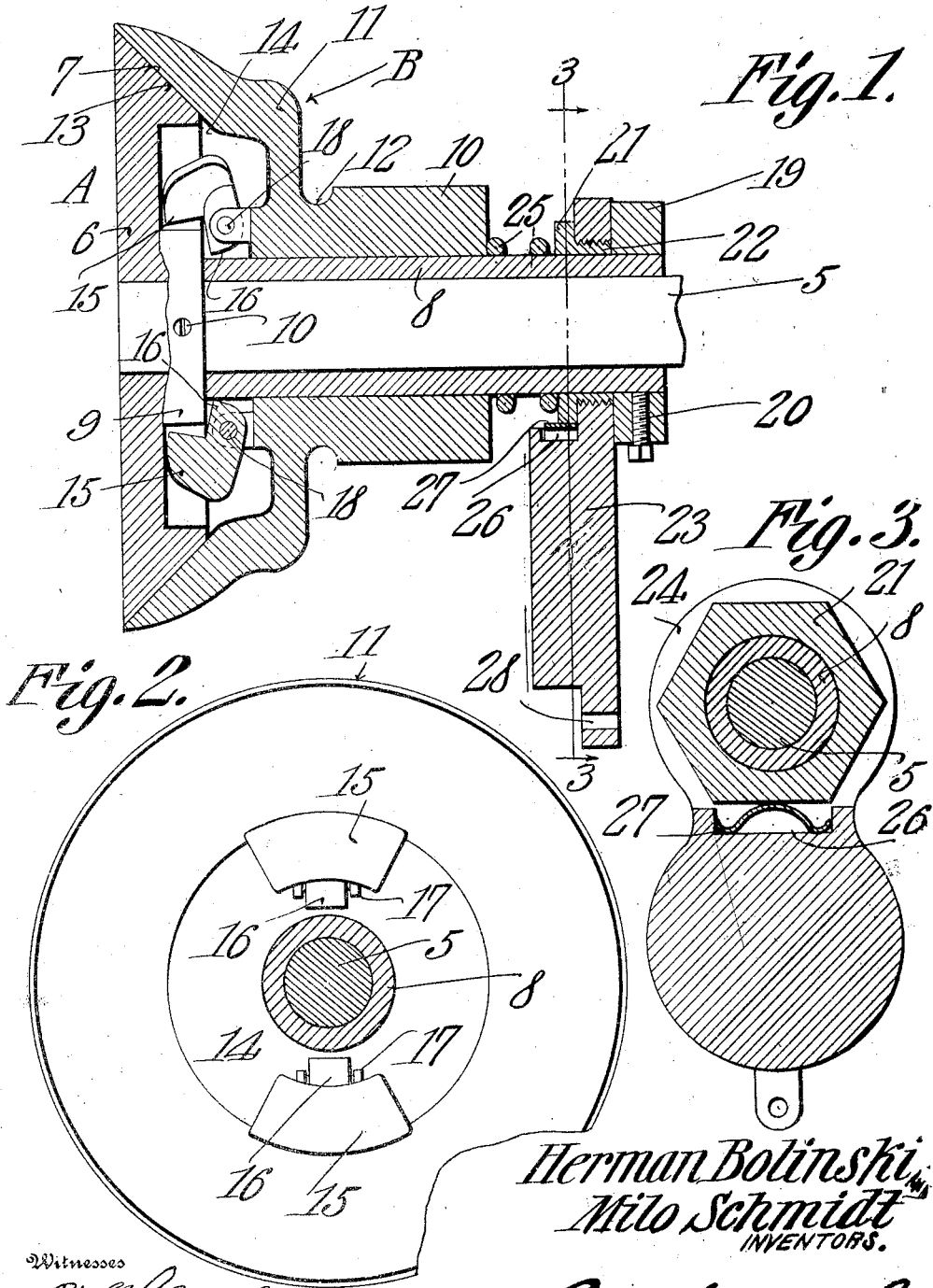

HERMAN BOLINSKI AND MILO SCHMIDT, OF NEW LONDON, WISCONSIN.

AUTOMATIC SPEED-CONTROLLING CLUTCH.

965,068.

Specification of Letters Patent. Patented July 19, 1910.

Application filed September 24, 1909. Serial No. 519,346.

*To all whom it may concern:*

Be it known that we, HERMAN BOLINSKI and MILO SCHMIDT, citizens of the United States, residing at New London, in the county of Waupaca, State of Wisconsin, have invented a new and useful Automatic Speed-Controlling Clutch, of which the following is a specification.

It is the object of the present invention to provide an improved construction of automatic speed controlling clutch, and the invention is directed chiefly to a clutch designed for use on line shafts, shafts for driving separators, and so forth.

It is one aim of the invention to provide a clutch of this class which will be compact in its structure and which will be simple in construction and not be liable to get out of order.

It is a further aim of the invention to provide means whereby the clutch may be so adjusted as to allow for rotation of a shaft upon which it is mounted, at a constant speed and further at any desired constant speed and to hold the parts at adjustment securely and against accidental disarrangement.

With the above and other objects in view, the invention consists in the construction and arrangement of parts shown in the accompanying drawings, in which:—

Figure 1 is a vertical longitudinal sectional view through a clutch constructed in accordance with the present invention. Fig. 2 is an end view in elevation of one member of the clutch. Fig. 3 is a vertical sectional view on the line 3—3 of Fig. 1 in a plane at right angles to the plane of the section of said Fig. 1.

In the drawings, there is shown a shaft 5 and fixedly secured upon this shaft is one member of the clutch embodying the present invention. This member of the clutch is indicated in general by the reference character A whereas the other member is indicated by reference character B and the first mentioned member comprises, in part, a head which is indicated by the numeral 6 and has an annular beveled clutch face 7. Integral with this head 6, which, aside from its clutch or working face 7 is of disk like form, is a sleeve 8 with which and the said head is integrally formed a bearing shoulder 9 which is annular and is located directly inwardly of the inner face of the head 6. A set screw 10 is threaded through this shoulder 9 and bears against the shaft 5 whereby to hold the clutch member A securely upon the shaft for rotation therewith.

It will be observed from an inspection of Fig. 1 of the drawings that the sleeve 8 is of considerable length and fitted upon the sleeve for sliding and for free rotative movement relative thereto is the other member of the clutch which is indicated by the reference character B. This other clutch member includes a pulley portion 10 and a head 11 between which two parts is a groove 12 to receive a strap belt or cable should it be desired to employ one. The head 11 is formed also with a beveled annular friction face which is indicated by the numeral 13 and coöperates with the face 7 of the clutch member A first described and that portion of the body 11 of the clutch member B upon which the face 13 is formed, projects laterally beyond the true end of the said body so that a concavity 14 is afforded in the end of the body.

The centrifugal elements of the device are clearly shown in Figs. 1 and 2 of the drawings and each of these elements consists of a weighted body portion which is indicated by the numeral 15 and a projecting stem portion 16. Upon the inner wall of the concavity 14 in the end of the body of the clutch member B are formed pairs of ears 17 and pivoted between the ears of each pair as at 18 is one of the stems 16 of one of the centrifugal elements.

It will be observed that the stems 16 extend radially inwardly from the bodies of the centrifugal elements but that they are offset with respect to the bodies in the direction of that face of the concavity 14 upon which they are mounted so that the major portion of the body portion of each centrifugal element is out of alinement or offset with respect to the plane of the pivot for the said element. In other words, the major part of the body portion of each centrifugal element lies normally to one side of a line drawn radially from the axis of the shaft and passing through the pivot for the respective element although it will be understood that when the clutch member B is rotating at a high speed, the centrifugal elements will tend to move to position with their centers of gravity coincident with the radial line heretofore mentioned as passing through the pivot for the element. The stems 16 of the several clutch elements are so arranged, as will be observed from an inspection of Fig. 1 of the drawings, that when the elements assume the position stated or nearly assume such position, the extremities of their stems will have bearing against the bearing shoulder 9 of the clutch member A and as the speed increases, the force of this bearing will be correspondingly increased and as a result the member B will be slid along the sleeve 8 to bring its clutch face 13 out of contact with the clutch face 7 of the member A.

A collar 19 is adjustably secured upon the sleeve 8 by a set screw 20 which is threaded therethrough and bears against the said sleeve and loosely disposed upon the sleeve is a nut having a polygonal head 21 and an exteriorly threaded sleeve extension 22. A weighted or overbalanced head is to be supported from the sleeve and this head has its body portion indicated by the numeral 23 and is formed with a disk like upper portion 24 into which the sleeve like extension 22 of the nut is threaded adjustably, the body 23 of the head being of considerable weight so as to normally depend or assume the position illustrated in Fig. 1 of the drawings. Before proceeding to a specific description of the function of the nut 21 and the head 23 it will be stated at this point that a spring 25 is disposed upon the sleeve 8 and bears at one end against that end of the pulley portion 10 of the clutch member B and at its other end against the face of the polygonal head 21 of the nut, the tension of this spring serving to hold the clutch member B normally in coöperative engagement with the clutch member A. It will be understood from the foregoing description of this portion of the device that if the head 21 is adjusted with respect to the head 23, the tension of the spring 25 will be adjusted or varied in view of the fact that the upper disk like portion of the head rests against the collar 19 and is limited by this collar in its movement toward the extremity of the sleeve. In fact, it is intended that the nut 21 shall be so adjusted whereby to vary the tension of the spring and in order that the nut may be held at the desired adjustment, means is provided which will now be explained.

As illustrated in Fig. 1 of the drawings, the body 23 of the head is of considerably greater thickness than the upper disk like portion 24 thereof and a portion of the body 23 therefore lies to one side beyond the plane of the corresponding face of the disk like portion 24 and in the upper edge of this offset portion of the head is formed a recess or seat 26 in which is disposed a bowed leaf spring 27, the convex side of the spring being presented uppermost. By referring to Fig. 3 of the drawings, it will be observed that this spring 27 bears against one or another of the several faces of the polygonal head 21 of the nut and by reason of such engagement with the nut, serves to hold the same firmly against rotation after having been adjusted to vary the tension of the spring. It will of course be understood that the weighted body portion 23 of the head is prevented, by reason of its weight, from rotating with the sleeve 8 and that therefore the nut 21 may be adjusted to vary the tension of the spring while the device is in full operation. Where the shaft 5 is to be rotated at an extremely high rate of speed, it is expedient that further means be provided for holding the head 23 against turning with the shaft or with the sleeve 8 and to this end, an opening 28 is formed in the lower end of the body portion of the head and through it may be secured one end of a cable, rod, or the like, the other end of which cable or rod may be secured to the floor or ceiling or other rigid support adjacent to which the clutch is located.

From the foregoing description of the invention, it will be understood that after the device has been properly assembled upon the shaft 5, the hub 21 is so adjusted as to secure the desired number of revolutions of the shaft before the stems of the centrifugal elements will come into bearing contact with the shoulder 9 and that should the speed of rotation of the clutch member B increase to such degree as to tend to cause the shaft 5 to rotate a number of revolutions greater than the desired number, the engagement of these stems 16 with the shoulder 9 will serve to bring the clutch member B out of coöperative contact with the member A until the shaft 5 has somewhat slackened in its speed of rotation whereupon the springs 25 will restore the parts to normal position.

It is of course to be understood that the actual area of contact surface between the stems 16 and the shoulder 9 will be so small as to insure against rotation of the member A with the member B after the clutch faces of the two members have become separated.

What is claimed is:—

1. In a device of the class described, a clutch member having a sleeve adapted to be secured upon a shaft, a clutch member slidably fitted upon the said sleeve, a spring upon the sleeve holding the last mentioned clutch member normally in contact with the first mentioned member, centrifugal elements carried by the last mentioned clutch member and adapted to have bearing against the first mentioned member to force the second mentioned member out of contact with the first mentioned member against the tension of the spring, a collar fixed upon the sleeve, a nut rotatable upon the sleeve, and a weighted head into which the nut is threaded, said nut being adjustable to adjust the tension of the spring.

2. In a device of the class described, a clutch member having a sleeve adapted to be secured upon a shaft, a clutch member slidably fitted upon the said sleeve, a spring upon the sleeve holding the last mentioned clutch member normally in contact with the first mentioned member, centrifugal elements carried by the last mentioned clutch member and adapted to have bearing against the first mentioned bearing to force the second mentioned member out of contact with the first mentioned member against the tension of the spring, a collar fixed upon the sleeve, a nut rotatable upon the sleeve, the said spring having bearing against the nut, a head into which the nut is threaded, the nut being adjustable with respect to the head whereby to vary the tension of the spring, and means carried by the head and coöperating with the nut to prevent rotation thereof.

3. In a device of the class described, a clutch member having a sleeve adapted to be secured upon a shaft, a clutch member slidably fitted upon the said sleeve, a spring upon the sleeve holding the last mentioned clutch member normally in contact with the first mentioned member, centrifugal elements carried by the last mentioned clutch member and adapted to have bearing against the first mentioned member to force the second mentioned member out of contact with the first mentioned member against the tension of the spring, a collar fixed upon the sleeve, a nut rotatable upon the sleeve, the said spring having bearing against the nut, a head into which the nut is threaded, the nut being adjustable with respect to the head whereby to vary the tension of the spring, and a spring carried by the head and bearing against the faces of the nut whereby to prevent rotation thereof.

4. In a device of the class described, a clutch member having a sleeve adapted to be secured upon a shaft, the said clutch member having a continuous bearing shoulder, a clutch member slidably fitted upon the said sleeve, a spring upon the sleeve holding the last mentioned clutch member normally in contact with the first mentioned member, and centrifugal elements pivoted to the second mentioned clutch and having weighted body portions normally out of alinement radially with respect to the pivot for the elements and portions adapted to have bearing against the bearing shoulder upon the first mentioned clutch member whereby when the body portion moves into such alinement, the said elements will have bearing against the said shoulder upon the first mentioned member whereby to force the second mentioned member out of contact with the first mentioned member against the tension of the spring.

In testimony that we claim the foregoing as our own, we have hereto affixed our signatures in the presence of two witnesses.

HERMAN BOLINSKI.
MILO SCHMIDT.

Witnesses:
HENRY GORGES,
JOHN COMIN.